Oct. 6, 1925.
N. H. RICE
HEADLIGHT
Filed June 4, 1923
1,556,159
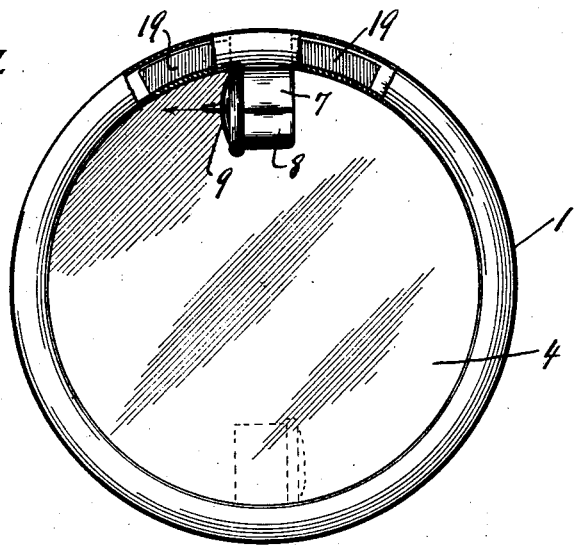
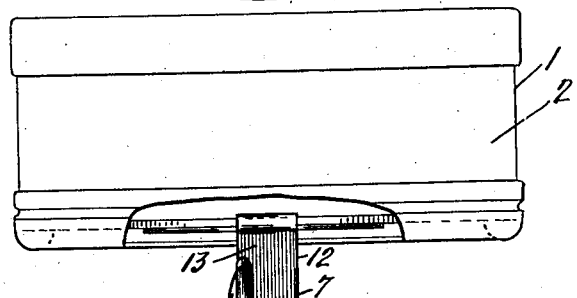
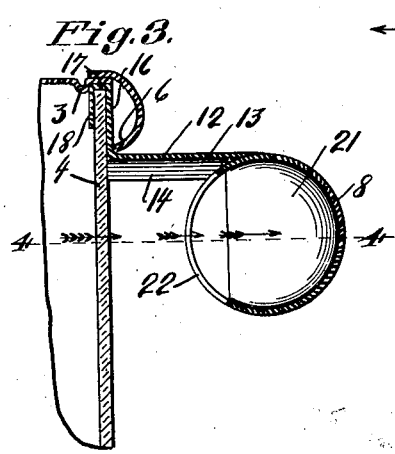
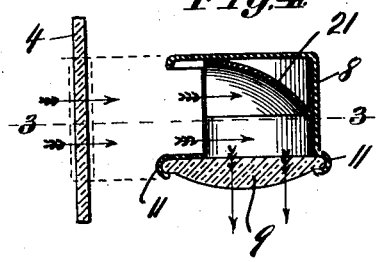
INVENTOR.
N.H.Rice
BY
ATTORNEYS.

Patented Oct. 6, 1925.

1,556,159

UNITED STATES PATENT OFFICE.

NORMAN H. RICE, OF SANTA BARBARA, CALIFORNIA.

HEADLIGHT.

Application filed June 4, 1923. Serial No. 643,379.

*To all whom it may concern:*

Be it known that I, NORMAN H. RICE, a citizen of the United States, and a resident of Santa Barbara, county of Santa Barbara, and State of California, have invented a new and useful Headlight, of which the following is a specification.

The present invention relates to improvements in headlights for motor vehicles and the like and has particular reference to an auxiliary reflector attachment adapted to be used in combination with the headlight and obtaining its source of light from the same. The attachment is intended to be used as a safety feature and is constructed to receive a part of the light rays emanating from the headlight and to reflect the same laterally, preferably through a colored medium so as to be visible from the side of the automobile, and to disclose the exact position of the same to a person approaching from the side.

The preferred form of the invention is illustrated in the accompanying drawing in which Figure 1 shows a front view of a headlight with my reflector attachment secured thereto; Figure 2 a top plan view of the same; Figure 3 a vertical section through arrangement taken substantially along line 3—3 of Figure 4; and Figure 4 a horizontal section taken along line 4—4 of Figure 3. While I have shown only the preferred form of the invention, it should be understood that various changes and modifications may be made within the scope of the claims hereto attached without departing from the spirit of the invention.

The headlight (1) may be of any suitable construction. As shown in the drawing it comprises a cylindrical housing (2) having an annular groove (3) formed in its front portion against which is placed the glass (4) which latter is held in position by the clamping ring (6) telescoped on the end of the housing. My attachment (7) which also may be made of any suitable form, preferably comprises a cylindrical housing (8) with a glass (9) held in place by a flange (11) of the housing. The auxiliary housing is supported transversely to the direction of the motor vehicle so that a light shining through the glass (9) may be seen from the side of the vehicle. The attachment is secured to the headlight by means of the bracket (12) comprising a flat strip of metal (13) having two downwardly extending flanges (14) for rendering the same more rigid and turned as shown at (16) to lie flat against the front face of the glass (4). The extreme end (17) may be squeezed between the glass (4) and the housing for the headlight and then turned as shown at (18) to engage the back face of the glass. That portion of the bracket lying against the front face of the glass is provided with lateral wings (19) following the curvature of the cylindrical housing and bearing on the glass.

Internally the auxiliary housing is provided with a reflecting plate (21) adapted to divert the light rays received from the headlight through an aperture (22) in the auxiliary housing laterally.

The operation and advantages of my device will be readily understood from the foregoing description. The attachment, being much smaller than the headlight, does not seriously interfere with the normal function of the headlight, that is with the illumination of the street in front of the motor vehicle. It will, however, receive through the aperture (22) a small part of the rays emanating from the headlight and will deflect the same laterally by means of the reflector (21). The colored glass (9) causes the light issuing from the reflector to be viewed as danger or signal light in view of the fact that similar colored lights are used at the present time for similar purposes. The bracket is well adapted to support the attachment in front of the headlight, is easily attached, well fortified by the flanges (14) and held against lateral vibration by the wings (19).

I claim:

1. In combination, a headlight housing presenting an annular front opening adapted to receive a lens therein, a second housing of smaller dimensions mounted transversely thereto having a reflector therein adapted to divert a portion of the light rays laterally and having a strip of material extending rearwardly therefrom, the strip being bent at its free end so as to allow the same to lie flat against the front face of the lens and to be turned over and around the edge of the same before the latter is inserted in the housing and having reinforcing flanges depending from its edges made to bear on the lens with the ends thereof, and means associated with the headlight housing made to bear against the front face of the lens and the strip of material after the latter two have been inserted.

2. In combination, a headlight housing presenting an annular front opening adapted to receive a lens therein, a second housing of smaller dimensions mounted transversely thereto having a reflector therein adapted to divert a portion of the light rays laterally and having a strip of material extending rearwardly therefrom, the strip being bent at its free end so as to allow the same to lie flat against the front face of the lens and to be turned over and around the edge of the same before the latter is inserted in the housing and having reinforcing flanges depending from its edges made to bear on the lens with the ends thereof, and means associated with the headlight housing made to bear against the front face of the lens and the strip of material after the latter two have been inserted, the strip of material having wings extending laterally from its bent portion to lie against the marginal portion of the lens for preventing lateral play of the reflector housing.

NORMAN H. RICE.